(12) United States Patent
Barnes et al.

(10) Patent No.: US 11,117,319 B2
(45) Date of Patent: *Sep. 14, 2021

(54) PRINTING MACHINE FOR FABRICATING 3D INTEGRATED COMPOSITE STRUCTURES AND HAVING A MULTIPLE EXTRUDER MODULE

(71) Applicant: NORTHROP GRUMMAN SYSTEMS CORPORATION, Falls Church, VA (US)

(72) Inventors: Eric G. Barnes, Rancho Palos Verdes, CA (US); Pedro A. Gonzalez, Palmdale, CA (US); Todd L. Szallay, Long Beach, CA (US); Steven J. Floyd, Monterey Park, CA (US); Sung S. Park, Rancho Palos Verdes, CA (US); Brett G. Morham, Manhattan Beach, CA (US); Cody J. Brown, Edmonds, WA (US); Reese R. Allen, Bothell, WA (US); Ryan L. Bischoff, Seattle, WA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/380,390

(22) Filed: Apr. 10, 2019

(65) Prior Publication Data
US 2020/0324473 A1 Oct. 15, 2020

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 64/20* (2017.08); *B33Y 10/00* (2014.12); *B33Y 30/00* (2014.12)

(58) Field of Classification Search
CPC ...... B29C 64/209; B29C 64/118; B29C 64/20
See application file for complete search history.

(56) References Cited

U.S. PATENT DOCUMENTS 4,750,960 A * 6/1988 Bubeck ................ B25J 15/0019
156/169
5,653,925 A 8/1997 Batchelder
(Continued)

FOREIGN PATENT DOCUMENTS

EP 2329935 A1 * 6/2011 ........... B29C 64/209
EP 2329935 A1 8/2011
(Continued)

OTHER PUBLICATIONS

Peng, Yong, et al. "Synergistic reinforcement of polyamide-based composites by combination of short and continuous carbon fibers via fused filament fabrication." Composite Structures (2018).
(Continued)

*Primary Examiner* — Joseph S Del Sole
*Assistant Examiner* — Jerzi H Moreno Hernandez
(74) *Attorney, Agent, or Firm* — Shumaker, Loop & Kendrick, LLP; John A. Miller

(57) ABSTRACT

A printing machine for fabricating high performance 3D integrated composite structures, where the machine includes a robot having a base portion, a robot arm and an end joint secured to the arm opposite to the base portion, a plurality of sources of extrudable material, and an end-effector mounted to the end joint. The end-effector includes a multiple-extruder module having a first extruder and a second extruder each including a separate nozzle assembly, wherein
(Continued)

the first extruder receives one extrudable material and the second extruder receives another extrudable material.

12 Claims, 6 Drawing Sheets

(51) Int. Cl.
*B29C 64/20* (2017.01)
*B33Y 30/00* (2015.01)
*B33Y 10/00* (2015.01)

(56) References Cited

U.S. PATENT DOCUMENTS

| | | | |
|---|---|---|---|
| 6,471,800 B2 | 10/2002 | Jang et al. | |
| 7,648,759 B2 | 1/2010 | Hirawaki et al. | |
| 8,603,385 B2 | 12/2013 | Costabeber | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,308,705 B2 | 4/2016 | Liou et al. | |
| 9,327,453 B2 | 5/2016 | Mark et al. | |
| 9,370,896 B2 | 6/2016 | Mark | |
| 9,440,397 B1 | 9/2016 | Fly | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,776,376 B2 | 10/2017 | Swartz et al. | |
| 9,815,268 B2 | 11/2017 | Mark et al. | |
| 9,908,291 B2 | 3/2018 | Mech | |
| 9,908,978 B2 | 3/2018 | Reese et al. | |
| 9,956,725 B2 | 5/2018 | Mark et al. | |
| 10,022,890 B2 | 7/2018 | La Forest et al. | |
| 10,035,305 B2 | 7/2018 | La Forest et al. | |
| 10,052,813 B2 | 8/2018 | Armijo et al. | |
| 10,059,053 B2 | 8/2018 | Jaker et al. | |
| 10,076,876 B2 | 9/2018 | Mark et al. | |
| 10,173,410 B2 | 1/2019 | Nardiello et al. | |
| 10,207,426 B2 | 2/2019 | Braley et al. | |
| 2004/0159724 A1* | 8/2004 | van der Steur | B05B 5/032 |
| | | | 239/690 |
| 2005/0115421 A1* | 6/2005 | Lyons | B41J 3/4073 |
| | | | 101/42 |
| 2010/0291310 A1* | 11/2010 | Hartmann | B25J 15/0019 |
| | | | 427/427.3 |
| 2012/0073726 A1 | 3/2012 | Koeniger et al. | |
| 2014/0061974 A1 | 3/2014 | Tyler | |
| 2014/0063096 A1* | 3/2014 | Pitz | B41J 11/002 |
| | | | 347/9 |
| 2014/0232035 A1 | 8/2014 | Bheda | |
| 2016/0031155 A1 | 2/2016 | Tyler | |
| 2016/0151833 A1* | 6/2016 | Tsao | B29C 64/106 |
| | | | 65/60.1 |
| 2016/0176118 A1* | 6/2016 | Reese | B33Y 50/02 |
| | | | 425/89 |
| 2016/0332372 A1 | 11/2016 | Fryska et al. | |
| 2017/0021565 A1 | 1/2017 | Deaville | |
| 2017/0173868 A1 | 6/2017 | Mark | |
| 2017/0198104 A1 | 7/2017 | Bheda et al. | |
| 2017/0341300 A1 | 11/2017 | Rudolph et al. | |
| 2017/0341301 A1 | 11/2017 | Van Tooren et al. | |
| 2018/0126667 A1 | 5/2018 | Wilenski et al. | |
| 2018/0178448 A1* | 6/2018 | Kakuta | B29C 64/393 |
| 2018/0207856 A1* | 7/2018 | Seriani | B29C 64/118 |
| 2018/0319098 A1* | 11/2018 | Armijo | B33Y 30/00 |
| 2018/0333915 A1* | 11/2018 | Montgomery | B33Y 30/00 |
| 2019/0022936 A1* | 1/2019 | Mansson | B25J 15/0019 |
| 2019/0047227 A1* | 2/2019 | Li | B29C 64/112 |
| 2019/0262986 A1* | 8/2019 | Newell | B29C 64/227 |
| 2020/0001522 A1* | 1/2020 | Manuel | B29C 70/384 |
| 2020/0031057 A1* | 1/2020 | Yan | B29C 64/241 |
| 2020/0324459 A1* | 10/2020 | Barnes | B29C 64/209 |
| 2020/0324472 A1* | 10/2020 | Barnes | B29C 64/241 |
| 2021/0031449 A1* | 2/2021 | Belcher | B29C 64/209 |

FOREIGN PATENT DOCUMENTS

| | | |
|---|---|---|
| EP | 2772347 A1 | 3/2014 |
| WO | 2016016887 A1 | 4/2016 |
| WO | 2018039260 A1 | 1/2018 |
| WO | 2018204574 A1 | 8/2018 |

OTHER PUBLICATIONS

Jiang, Delin, and Douglas E. Smith. "Anisotropic mechanical properties of oriented carbon fiber filled polymer composites produced with fused filament fabrication." Additive Manufacturing 18 (2017): 84-94.

Automated Fiber Placement Systems Overview, Konrad Kozaczuk, Transactions of the Institute of Aviation, No. 4 (245), pp. 52-59, Warsaw 2016 https://ilotedu.pl/prace_ilot/public/PDF/spis_zeszytow/245_2016/6.pdf.

Recent Developments in Automated Fiber Placement of Thermoplastic Composites, Zachary August, Graham Ostrander, John Michasiow, and David Hauber, Automated Dynamics, https://pdfs.semanticscholar.org/41 la/f6ac6cc3f7306fc1c75aef3e03eedec49 1c4.pdf.

ManufacTube: "6-axis KUKA 3D printing robot," Aug. 5, 2016 (Aug. 5, 2016), p. 1, XP054980558, Retrieved from the Internet: URL:https://www.youtube.com/watch?v=K-12XAkZxVg [retrieved on Jun. 12, 2020].

PCT International Search Report of the International Searching Authority dated Aug. 6, 2020 for International Application No. PCT/US2020/025319 filed Mar. 27, 2020.

* cited by examiner

PRINTING MACHINE FOR FABRICATING 3D INTEGRATED COMPOSITE STRUCTURES AND HAVING A MULTIPLE EXTRUDER MODULE

BACKGROUND

Field

This disclosure relates generally to a printing machine for fabricating high performance 3D integrated composite structures and, more particularly, to a fused filament fabrication (FFF) printing machine for fabricating high performance 3D integrated composite structures, where the machine includes a robot end-effector including a multiple-extruder module having a first extruder and a second extruder each including a separate nozzle assembly, where the first extruder receives one extrudable material and the second extruder receives another extrudable material.

Discussion

Fused filament fabrication (FFF) is an additive manufacturing (AM) technology and is a technique used for 3D printing. More specifically, a FFF process provides a stock material to a heated nozzle, where it is extruded therefrom to be laid down layer by layer to build up a desired product, and where the molten polymer or fiber reinforced polymer material immediately begins to harden once it is extruded from the nozzle. The molten material may be generated from different feedstock, such as pre-shaped filaments or pellets.

Various materials may be used for FFF, such as high performance amorphous or semi-crystalline thermoplastics including polyetheretherketone (PEEK), polyetherketoneketone (PEKK), polyphenylsulfone (PPSF or PPSU), polyetherimide (PEI) and polyphenylene (PPS). Other materials that may be suitable for FFF include acrylonitrile butadiene styrene (ABS), polylactic acid (PLA), polycarbonate (PC), polyamide (PA), polystyrene (PS), lignin, rubber, carbon fibers, glass fibers, quartz fibers, Kevlar fibers, ultra-high molecular weight polyethylene (UHMWPE), Dyneema, high impact polystyrene (HIPS), nylon, high density polyethylene (HDPE) eutectic materials, plasticine, room temperature vulcanization (RTV) silicone, etc.

Traditional complex composite fabrication methods, such as autoclave cured hand lay-up, automated fiber placement, tape placement, etc. are labor intensive, expensive, require a long-lead and expensive tooling and typically requires talented fabrication technicians. Known composite additive manufacturing approaches are only capable of providing relatively low fiber volume, high porosity and low structural performance. Known additive manufacturing or 3D printing technologies are actually 2.5D, where the machine builds a layer in the x-y plane, then the machine stops, moves the build platform in the z-direction, and builds another layer in the x-y plane, thus it is a planar process. A true 3D fabrication process would build in the x, y and z directions concurrently. However, since there is no integrated additive manufacturing fabrication system that can build composites in a true 3D manner, there are significant limitations on the value of the current printing capability and these systems will never achieve high performance structural requirements because the fibers will typically not be aligned with the direction of the highest stresses on the part.

Known additive manufacturing 3D printing machines often employ a gantry style approach having an end-effector that lays down the additive material in the x-y plane. However, gantry style machine approaches make scalability, affordability and flexibility a challenge for a fabrication cell because there is a direct correlation between the size of the part being fabricated and the size of the gantry machine required, where the gantry machine is capable of only a single operation at one time. Very large parts require very large machines, thus driving the required footprint and machine cost. Robotic approaches provide greater flexibility and easier scale-up. For example, multiple robots can work within the same cell. Additionally, each robot can be mounted to a movable base that allows for repositioning at different locations within or around the cell. Robotic approaches allow for additional robot poses that increase the number of degrees of freedom, the ability to fabricate in 3D, and fabrication flexibility through multiple robots performing multiple tasks.

DETAILED DESCRIPTION OF THE EMBODIMENTS

The following discussion of the embodiments of the disclosure directed to a 3D printing machine for fabricating high performance 3D integrated composite structures is merely exemplary in nature, and is in no way intended to limit the disclosure or its applications or uses.

Figure 1:
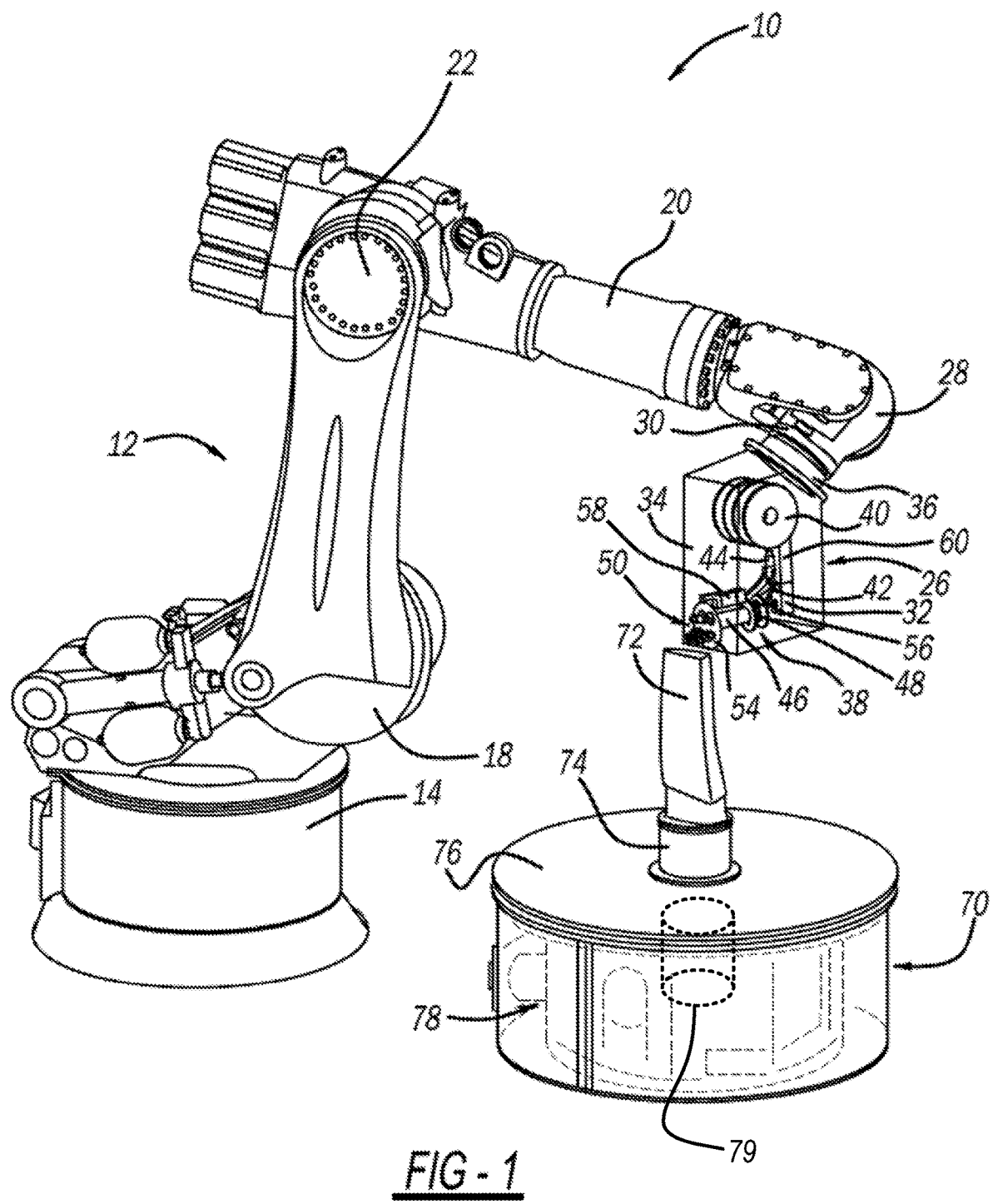
FIG. 1 is an isometric view of a 3D printing machine including a robot, an end-effector mounted to the robot and being positioned in a horizontal orientation, and a rotatable extruder module.

FIG. 1 is an isometric view of a 3D printing machine 10 including a robot 12 having a base portion 14, an extension arm 16 coupled to the base portion 14 by a rotary and pivot joint 18, and a working arm 20 coupled to the extension arm 16 opposite to the base portion 14 by an elbow pivot joint 22. An end-effector 26 is coupled to the working arm 20 at an angle opposite to the joint 22 by a pivot joint 28 having a coupling mechanism 30. The robot 12 is intended to represent any suitable positioning device for the end-effector 26. The end-effector 26 operates as a print-head assembly for laying down a molten fiber, filament, etc. for building a complex composite structure as described herein. Various end-effectors will be discussed herein that operate in certain manners and have certain features, and that can be attached to the robot 12. It is noted that during operation, the machine 10 may or may not be positioned within an oven (not shown) so that the temperature of the printing process and the ambient temperature surrounding the part is controlled.

The end-effector 26 includes an outer housing 34 and a rotatable connector 36 that is releasably and rotatably connected to the coupling mechanism 30, where the housing 34 is shown as being transparent to illustrate the various components therein. Those components include a number of spools 40, here three, on which a plurality of filaments 42 of various materials are wound, a motor 44 for selectively and independently drawing the filaments 42 off of the spools 40, a right angle gear box 32 coupled to a filament feed assembly 48 by a shaft 56, a rotary assembly 38 having a barrel 46 that is turned by an indexing motor 58 and through which the filaments 42 are drawn and melted, an end plate 54 mounted to an end of the barrel 46 and a nozzle assembly 50 that extends through the plate 54 and is part of the extruder module. The spools 40 can be mounted in the end-effector 26 as shown, or mounted remotely with the material being fed to the end-effector 26 through a tube (not shown). Alternately, the stock material can be provided by pellets instead of using the filament 42.

Figure 2:
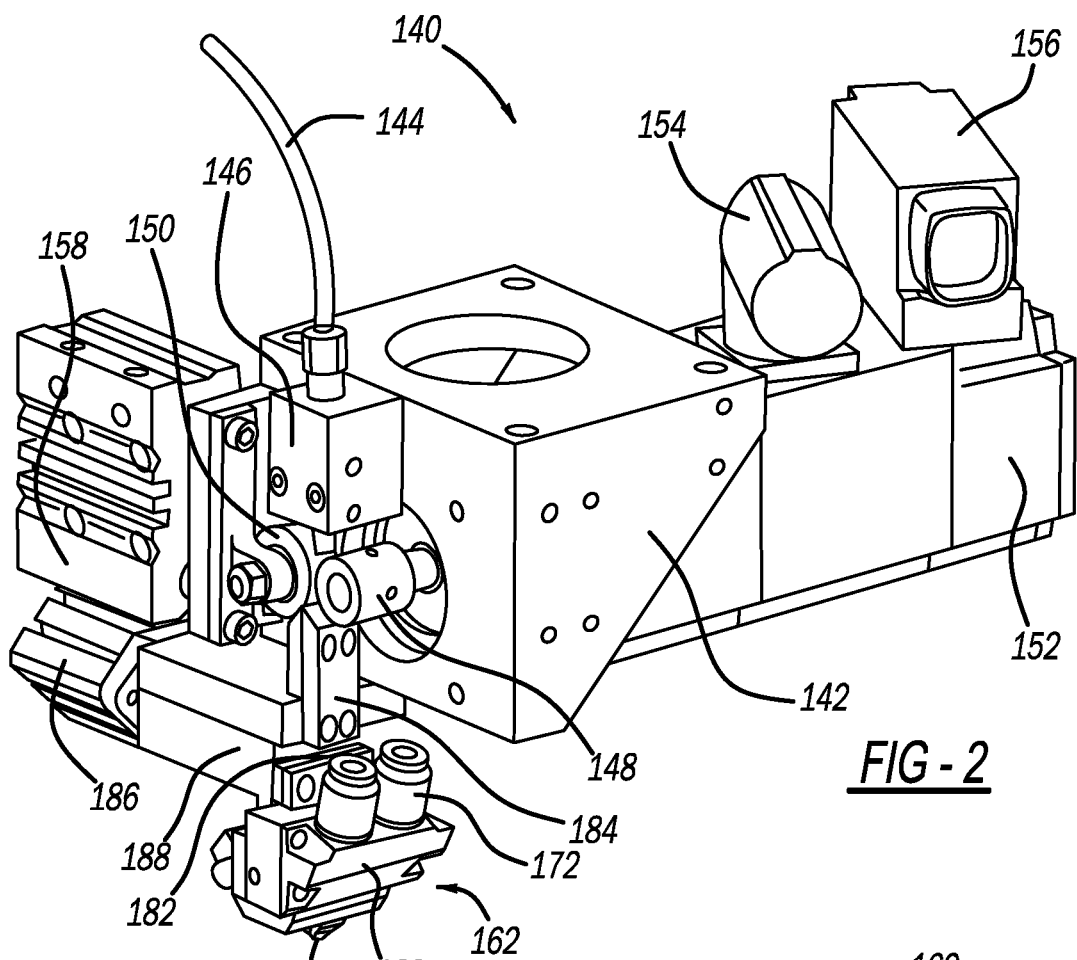
FIG. 2 is an isometric view of a continuous fiber extruder module that can be used in the end-effector shown in FIG. 1.

FIG. 2 is an isometric view of a continuous fiber extruder module 140 that is one non-limiting example of the type of extruder module that can be provided within the end-effector 26 and is rotated by the rotary assembly 38, where the module 140 is fitted with a mounting bracket 142 that allows it to be attached to the end-effector 26. The module 140 receives a filament 138 (see FIG. 4) through a filament guide tube 144, where the filament 138 passes through a filament guide tube mounting bracket 146 and then between a feed roller 148 and a clamp roller 150. The feed roller 148 is coupled to a feed motor 152 having a power connector 154 and an encoder 156, which provides the motive force to feed the filament 138 through the module 140. The clamp roller 150 is coupled to a clamp roller actuator 158 that presses the clamp roller 150 against the filament 138, thus pinching the filament between the feed roller 148 and the clamp roller 150 with a selected amount of force, which ensures that sufficient traction is created between the feed roller 148 and the filament 138 to allow the filament 138 to be fed without slipping.

Figure 3:
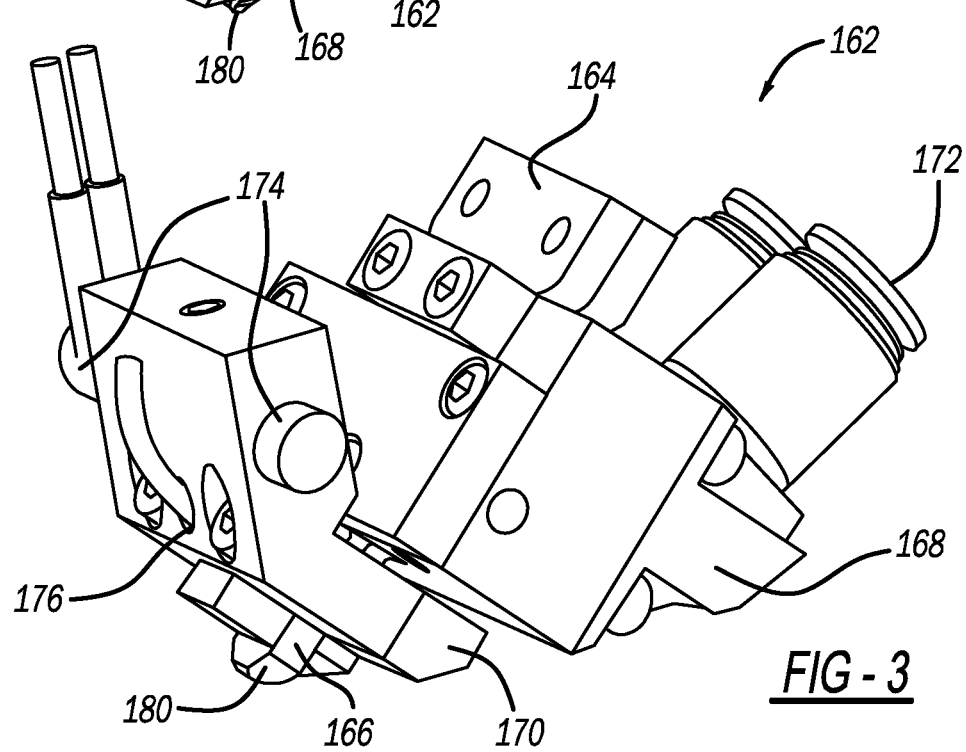
FIG. 3 is an isometric view of a nozzle assembly in the extruder module shown in FIG. 2.
Figure 4:
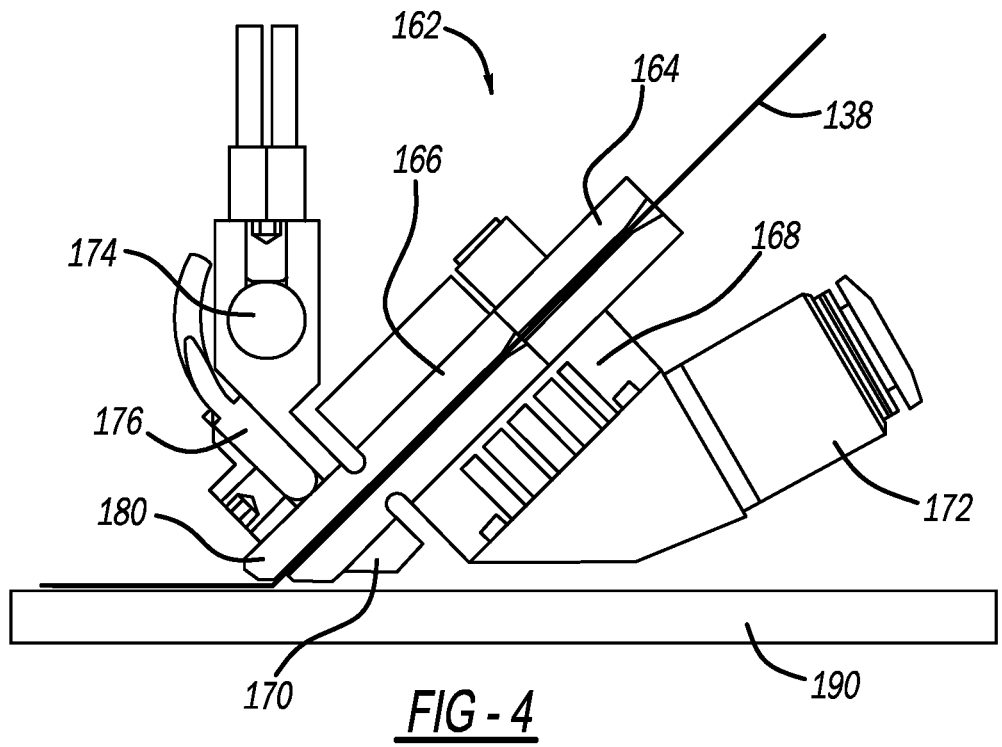
FIG. 4 a cross-sectional view of the nozzle assembly shown in FIG. 3 relative to a build-plate.

The filament 138 then passes through a filament guide 184 and into a nozzle assembly 162. FIG. 3 is an isometric view and FIG. 4 is a cross-sectional view of the nozzle assembly 162 separated from the module 140. The nozzle assembly 162 includes a filament inlet 164 and a nozzle 166, around which are clamped a cooling block 168 and a heating block 170, where the cooling block 168 receives a liquid coolant through a set of coolant hose connectors 172. The heating block 170 is heated by a heating element 174 and its temperature is monitored by a temperature sensor 176, which could be a thermocouple, thermistor, resistance temperature detector (RTD), or similar type of temperature sensor. This arrangement ensures that the filament 138 remains at a temperature that is less than the melting point of its polymer component until it arrives at a nozzle tip 180 of the nozzle 166. The filament 138 is then heated at the end of the nozzle 166 to melt the polymer so that the filament 138 will bond to a build surface 190 when it emerges from the nozzle tip 180.

A cutter 182 is provided between a filament guide 184 and the nozzle assembly 162 that is moved by a cutter actuator 186 and is constrained by a cutter guide 188. When the cutter actuator 186 is actuated, it moves the cutter 182 towards the filament 138 at high speed and with a selected amount of force, in a direction perpendicular to the filament feed direction, shearing the filament 138 against the underside of the filament guide 184 and cutting through the entire filament 138. This allows the filament 138 to be automatically cut to the appropriate length as it is being printed. The filament 138 is only extruded from the nozzle 166 in one direction, so the nozzle 166 must be rotated to different orientations in order to be able to extrude the filament 138 in different directions. This is different from conventional 3D printing nozzle designs, which are not sensitive to the rotation of the nozzle 166 and can print in any direction as long as the print direction is normal to the axis of the nozzle 166.

The continuous fiber-reinforced 3D printing process is sensitive to the orientation of the nozzle assembly 50. The machine overcomes some of this sensitivity by making the nozzle assembly 50 rotatable. Additionally, by making the nozzle assembly 50 rotatable relative to the rest of the end-effector 26, the direction of the filament 42 as it is extruded from the end-effector 26 can be controlled without needing to rotate the entire end-effector 26. The end-effector 26 may be relatively large and unwieldy compared to the rotary assembly 38, so being able to control the orientation of the extruder module independently of the orientation of the end-effector 26 significantly improves dexterity of the machine 10.

As mentioned above, the part that is being built by the printing process is formed on a build platform. In the design of the machine 10 a rotary circular table 70 is employed on which a part 72 being printed or fabricated is shown. An optional riser 74 is provided at a center of the table 70 and the part 72 is positioned on the riser 74. However, it is noted that in some designs, the riser 74 may not be needed. The end-effector 26 is shown positioned adjacent to the part 72 and is in the horizontal orientation. By providing the riser 74 on which the part 72 sits, the part 72 is separated some suitable distance from a top surface 76 of the table 70 so as to provide clearance between the end effector 26 and the table 70 that is desirable for effectively printing small-diameter parts. In one embodiment, the riser 74 is fabricated from a highly thermally conductive material, such as copper, so as to improve thermal transfer to the part 72 and maintain part thermal stability and adhesion of the part 72 to the surface of the riser 74. The riser 74 can be provided in different shapes, sizes and heights to be more effective for fabrication of parts having a wide range of geometries. A side of the table 70 is shown as being transparent to illustrate suitable components 78 therein that allow the table 70 to be rotated and including a heat source 79 configured to allow the riser 74 to be heated.

Figure 5:
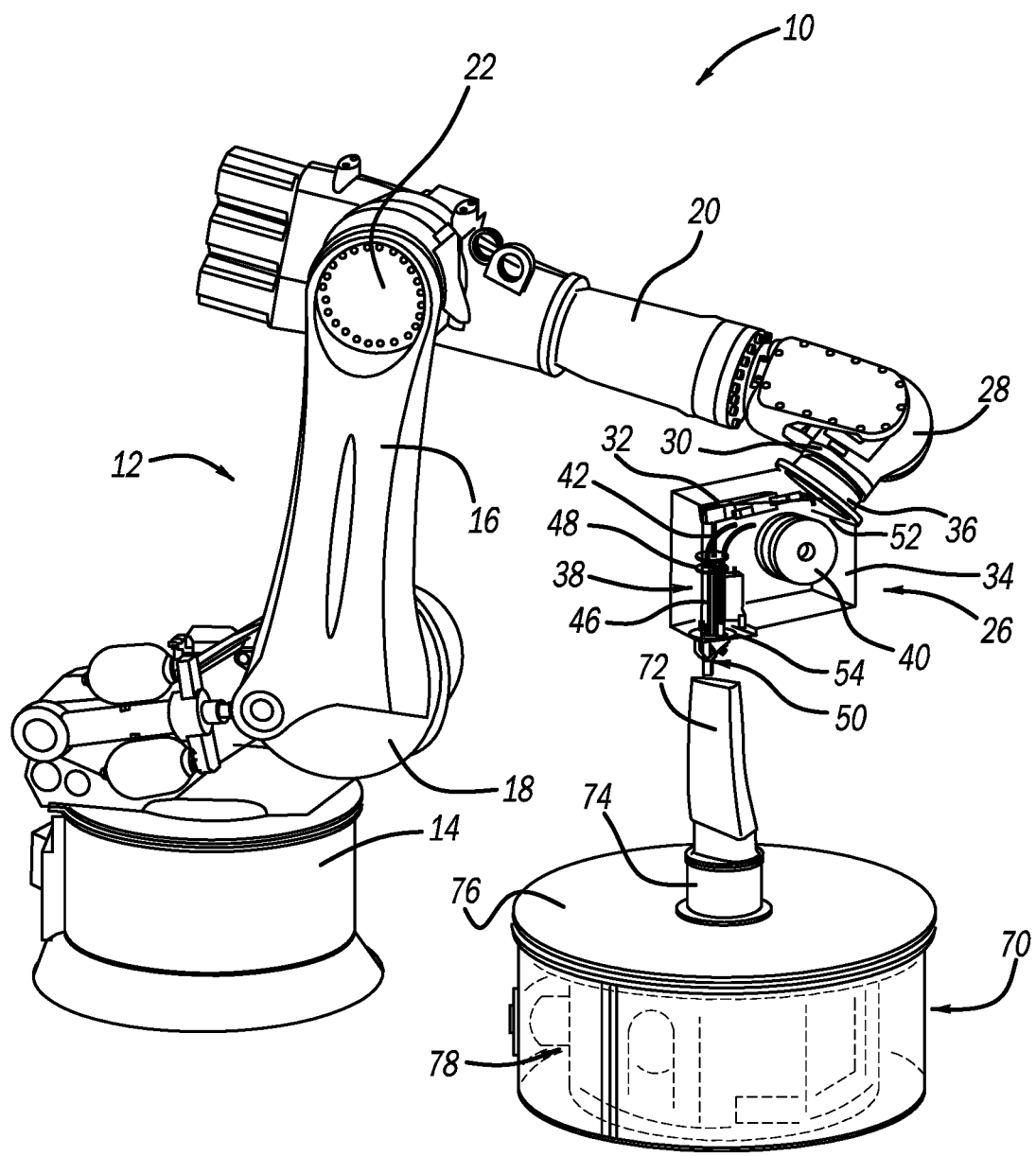
FIG. 5 is an isometric view of the 3D printing machine shown in FIG. 1 with the end-effector positioned in a vertical orientation.

The end-effector 26 is coupled to the coupling mechanism 30 at an angled orientation on an angled wall 52, where the end-effector 26 is shown in a predominantly horizontal orientation in FIG. 1 so that the nozzle assembly 50 is directed parallel to the build platform, which allows the filaments 42 to be laid down on a side of the build surface. FIG. 5 is an isometric view of the 3D printing machine 10 where the connector 36 has been rotated so that the orientation of the end-effector 26 is changed to a predominantly vertical orientation, which allows the filaments 42 to be laid down on the top of the build surface. Intermediate orientations between the predominantly horizontal and the predominantly vertical orientations are also possible. The capability of rotating the end-effector 26 in this manner allows the nozzle assembly 50 to be oriented normal to the build surface, i.e., the build plate or the part 72, in a much larger number of scenarios while reducing the number of robot poses that are required. More specifically, the standard approach is to program a wide variety of robot poses for a specific component build. However, the approach described herein in which the end-effector 26 is rotatable using the rotatable connector 36 at an angled orientation on the angled wall 52 improves repeatability while simplifying path programming. This is illustrated by the fact that the pose of the robot 12 in FIGS. 1 and 5 is nearly the same. Further, this feature minimizes wear and tear on the customized robot tooling by minimizing robot movement.

The continuous fiber-reinforced 3D printing process is sensitive to the orientation of the nozzle assembly 50. By making the extruder module rotatable relative to the rest of the end-effector 26, the direction of the filament 42 as it is extruded from the nozzle assembly 50 can be controlled without the need to rotate the entire end-effector 26. The end-effector 26 may be relatively large and unwieldy compared to the extruder module, so being able to control the orientation of the extruder module independently of the orientation of the end-effector 26 significantly improves the dexterity of the 3D printing machine 10.

Figure 6:
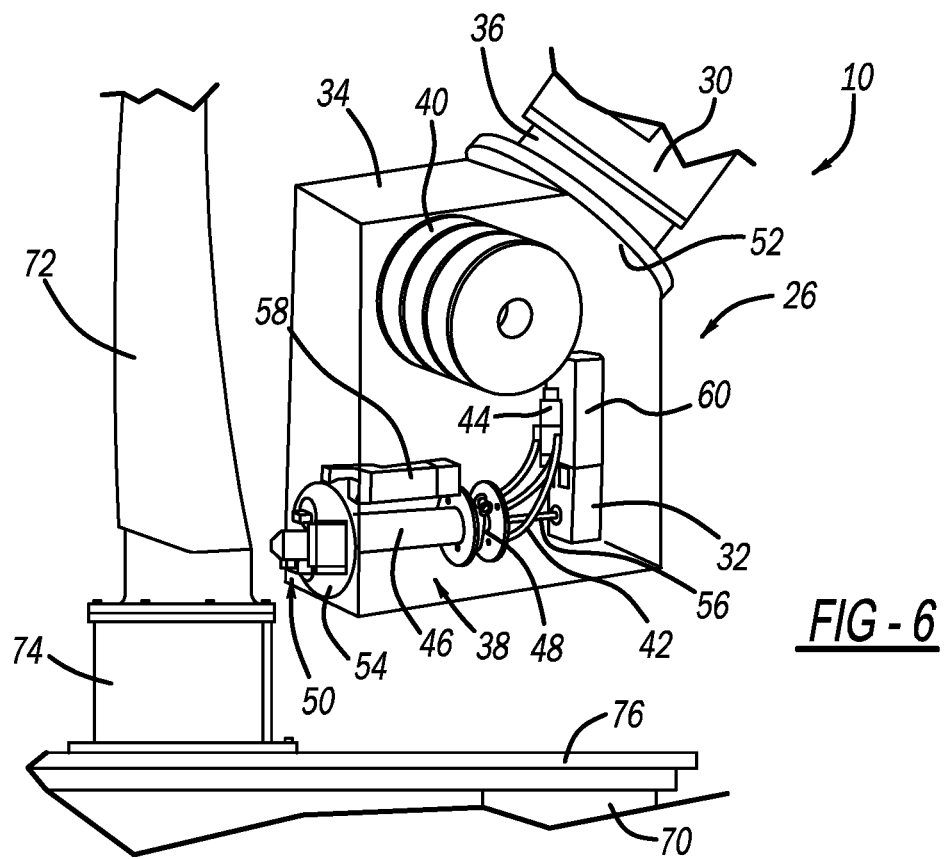
FIG. 6 is a broken-away isometric view of the 3D printing machine in the orientation as shown in FIG. 1 with the nozzle assembly rotated in one orientation.

FIG. 6 is a broken-away, isometric view of the 3D printing machine 10 shown oriented in the horizontal direction with the nozzle assembly 50 rotated by the rotary assembly 38 in one orientation. This illustration shows the capability of the nozzle assembly 50 to print in one certain direction.

Figure 7:
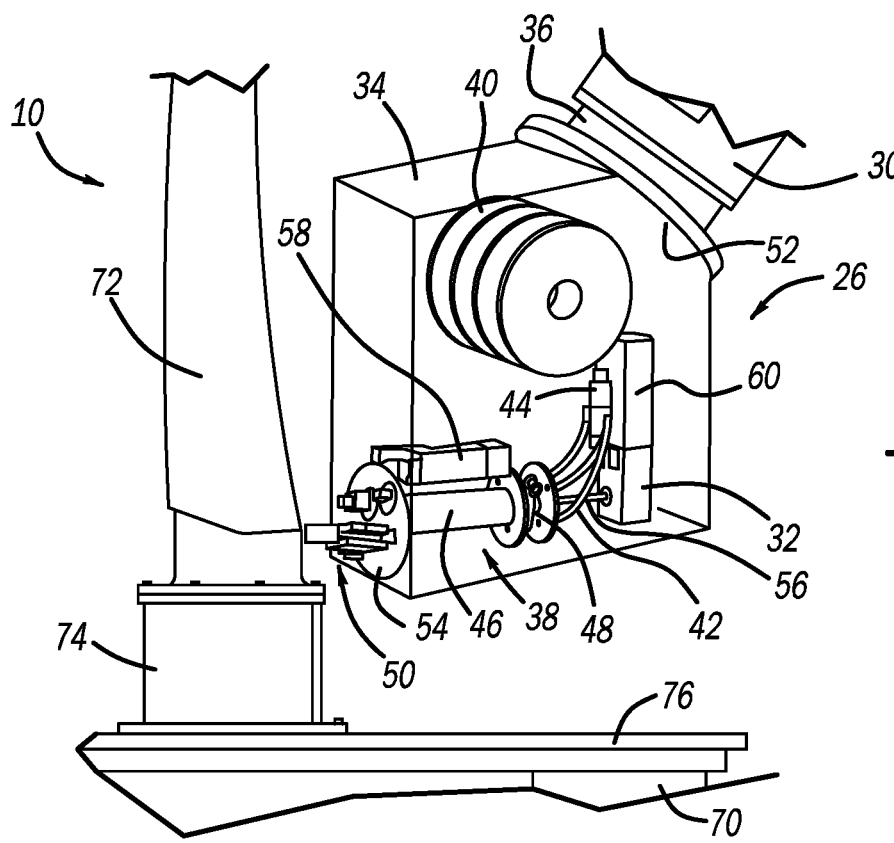
FIG. 7 is a broken-away isometric view of the 3D printing machine in the orientation as shown in FIG. 1 with the nozzle assembly rotated in a 90° orientation.

FIG. 7 is a broken-away, isometric view of the 3D printing machine 10 also shown oriented in the horizontal direction with the nozzle assembly 50 rotated 90° by the rotary assembly 38 in another orientation. This illustration shows the capability of the nozzle assembly 50 to print in a dramatically different manner than FIG. 6, but with the robot 12 oriented in substantially the same pose as in FIG. 1.

Figure 8:
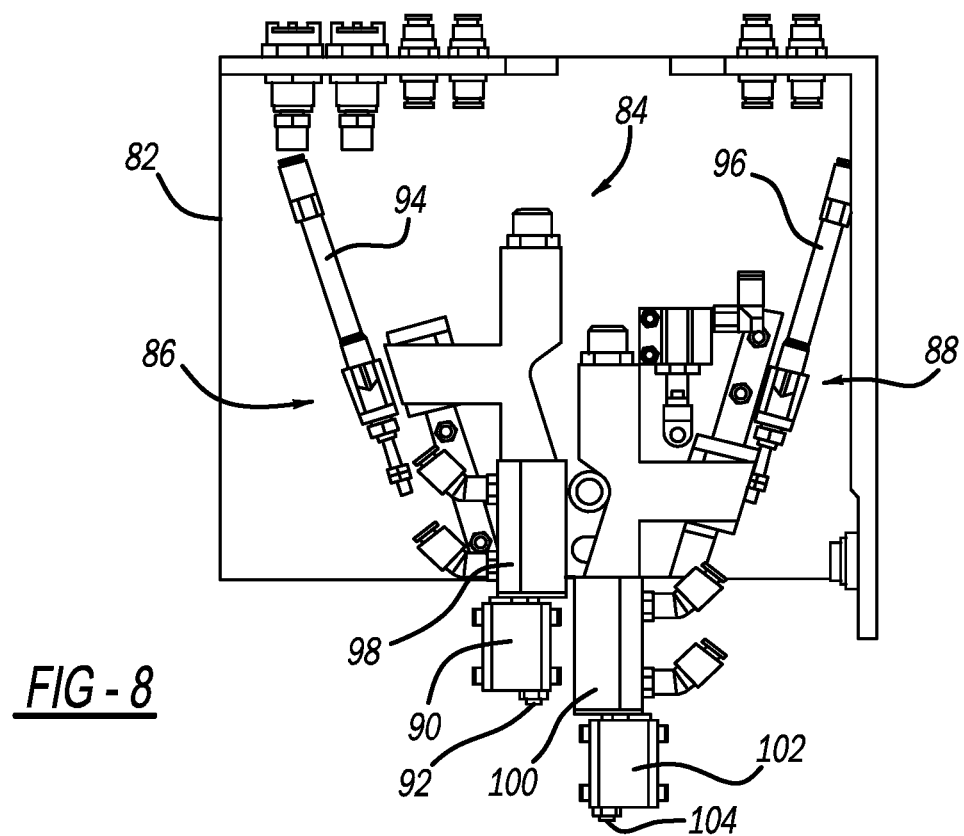
FIG. 8 is a broken-away side view of a dual-head extruder module that can be mounted within the end-effector of the 3D printing machine shown in FIG. 1.

FIG. 8 is a broken-away side view of an extruder module 80 that is designed to be mounted within the end-effector 26 and rotated by the rotary assembly 38. The module 80 includes an outer housing 82 that encloses an integrated dual extruder assembly 84 having a first extruder module 86 and a second extruder module 88. In this embodiment, the extruder module 86 includes a cold block 98 and a heater block 90 clamped around a nozzle 92 that extrudes one variety of a polymer or chopped-fiber-filled polymer (not shown) and the extruder module 88 includes a cold block 100 and a heater block 102 clamped around a nozzle 104 that extrudes another variety of a polymer or chopped-fiber-filled polymer (not shown). The nozzle 92 is extended out of and retracted back into the housing 82 by an actuator 94 and the nozzle 104 is extended out of and retracted back into the housing 82 by an actuator 96. The filaments may be polymer only, polymer reinforced with short-length fibers or particles of another reinforcing material or polymer reinforced with continuous fibers.

Figure 9:
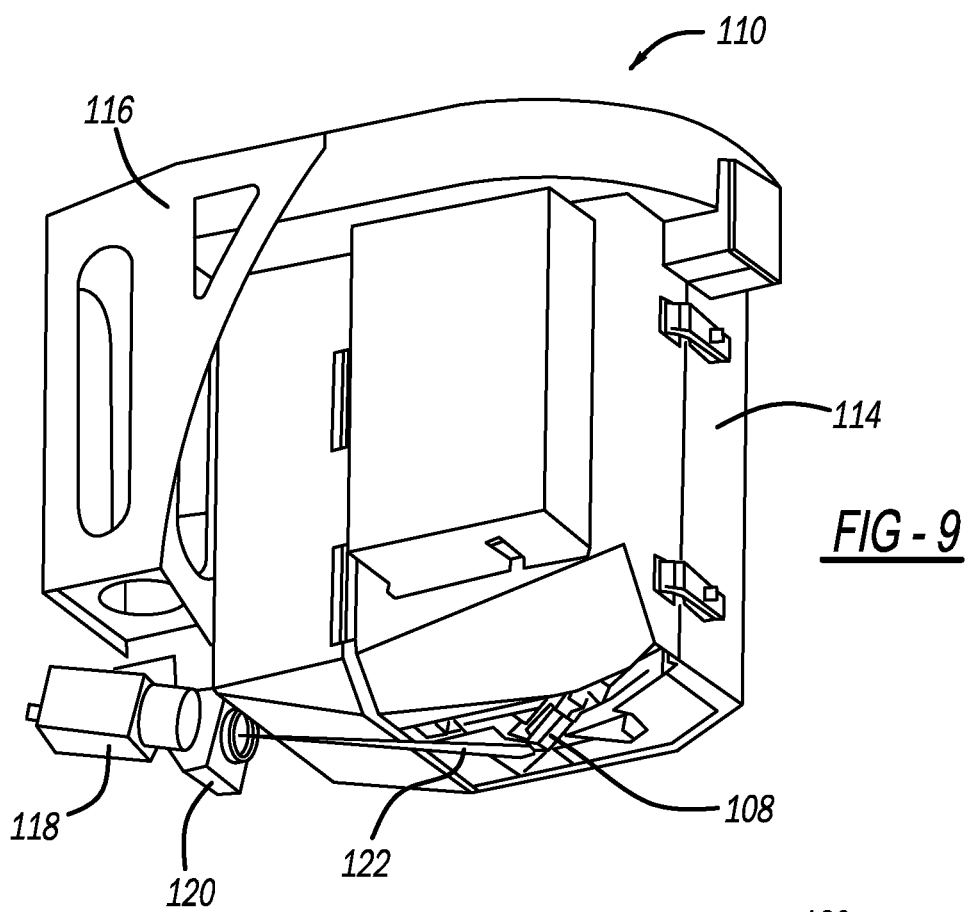
FIG. 9 is an isometric view of an end-effector capable of being used with the 3D printing machine shown in FIG. 1 and including an integrated laser optics and IR camera.

FIG. 9 is an isometric view of an end-effector 110 capable of being used with the 3D printing machine 10. The end-effector 110 includes a nozzle 108 extending therefrom. A bracket 116 is mounted to the housing 114 and an IR camera 118 or pyrometer and a laser focusing optics assembly 120 are connected to the bracket 116. The laser focusing optics assembly 120 focuses a laser beam 122 that is used to heat the extruded material and preheat the area in the immediate vicinity of the nozzle 108, where the camera 118 measures the temperature of that area to improve reliability of the printing process. The additional polymer flow from localized laser heating reduces porosity and allows for increased continuous carbon fiber volume, thus enhancing performance of the composite structure. The laser focusing optics assembly 120 and the IR camera 118 can also be mounted within the housing 114, and operate through a window (not shown) made of glass or a similar transparent material.

Figure 10:
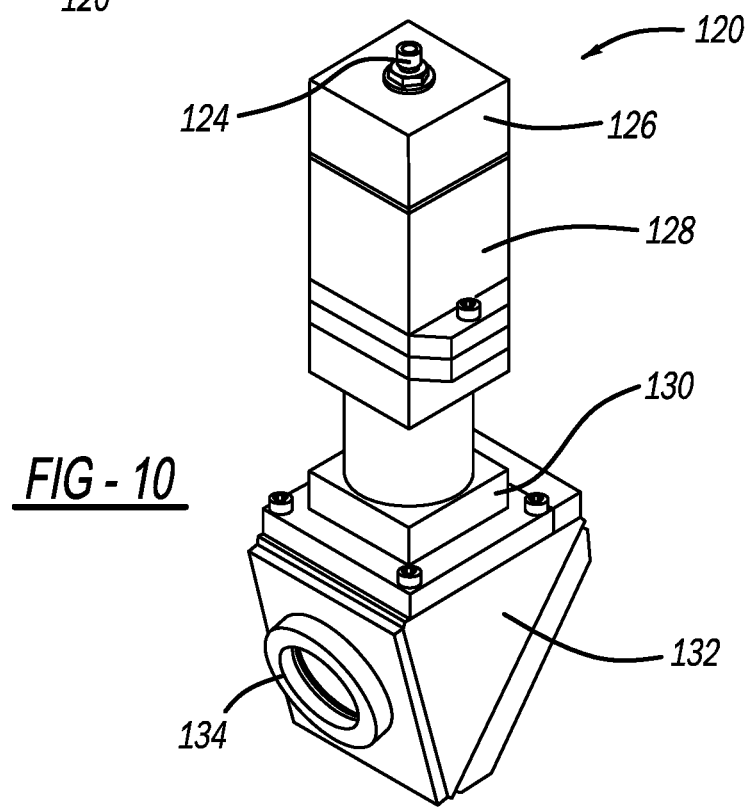
FIG. 10 is an isometric view of the laser optics shown in FIG. 9 separated from the end-effector.

FIG. 10 is an isometric view of the laser focusing optics assembly 120 separated from the end-effector 110. The laser optics assembly 120 includes a connector for connecting the laser focusing optics assembly 120 to fiber optics 124, collimating and beam shaping optics 126 and 128 for collimating the laser beam 122, a focusing lens 130 for focusing the laser beam 122, folding optics 132 for bending the laser beam 122 and a glass housing cover 134 through which the laser beam 122 exits the laser focusing optics assembly 120.

In alternate embodiments, the machine 10 can be equipped with a machine vision system for automatically calibrating tool point definitions of various printer modules. Further, the machine 10 can include a customized cooling suit that allows the machine 10 to fabricate the part in a high temperature oven, which allows composite structure fabrication with high temperature and high performance thermoplastics and having a high toughness and chemical resistance.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A 3D printing machine for fabricating a composite part, said machine comprising:
 a robot including a base portion, a robot arm and an end joint secured to the robot arm opposite to the base portion;
 a plurality of sources of extrudable material; and
 an end-effector comprising an outer housing with an obliquely-angled corner wall, the end-effector being mounted to the end joint via a rotatable connector secured to the obliquely-angled corner wall, said end-effector including a multiple-extruder module inside the outer housing having a first extruder and a second extruder each including a separate nozzle assembly selectively extendable from the outer housing, wherein the first extruder receives one extrudable material and the second extruder receives another extrudable material, wherein the multiple-extruder module is arranged in the outer housing such that an axis of rotation of the rotatable connector is slanted with respect to a plane in which extrusion axes of the nozzle assemblies lie on, and wherein a rotation of the end-effector at the rotatable connector is configured to change an orientation angle of the extrusion axes of the nozzle assemblies relative to a horizontal plane without changing a pose of the robot.

2. The machine according to claim 1 wherein the first extruder includes a first actuator for retracting and extending its nozzle assembly into and out of the outer housing and the second extruder includes a second actuator for retracting and extending its nozzle assembly into and out of the outer housing.

3. The machine according to claim 1 wherein the end-effector further includes a rotary assembly inside the outer housing, said multiple-extruder module being mounted to the rotary assembly, said rotary assembly being rotatable so as to rotate the nozzle assemblies relative to the composite part without rotating the end-effector.

4. The machine according to claim 1 further comprising a table positioned relative to the end-effector, said composite part being fabricated on the table and said table being rotatable.

5. The machine according to claim 4 further comprising a riser being positioned on the table, wherein the composite part is fabricated on the riser so that it is spaced from the table.

6. The machine according to claim 5 wherein the table includes a heat source for heating the table and the riser.

7. The machine according to claim 1 wherein the end-effector further includes a laser that generates a laser beam for heating the extruded material and an area in an immediate vicinity of the nozzle assemblies.

8. The machine according to claim 7 wherein the end-effector further includes a camera or a pyrometer that measures the temperature of the area heated by the laser beam.

9. A 3D printing machine for fabricating a composite part, said machine comprising:
- a robot including a base portion, a robot arm and an end joint secured to the robot arm opposite to the base portion; and
- an end-effector comprising an outer housing with an obliquely-angled corner wall, the end-effector being mounted to the end joint via a rotatable connector secured to the obliquely-angled corner wall, said end-effector including a plurality of spools inside the outer housing each holding a different wound filament of extrudable material and a multiple-extruder module inside the outer housing having a first extruder and a second extruder each including a separate nozzle assembly selectively extendable from the outer housing, wherein the first extruder receives one extrudable material and the second extruder receives another extrudable material, wherein the multiple-extruder module is arranged in the outer housing such that an axis of rotation of the rotatable connector is slanted with respect to a plane in which extrusion axes of the nozzle assemblies lie on, and wherein a rotation of the end-effector at the rotatable connector is configured to change an orientation angle of the extrusion axes of the nozzle assemblies relative to a horizontal plane without changing a pose of the robot.

10. The machine according to claim 9 wherein the first extruder includes a first actuator for retracting and extending its nozzle assembly into and out of the outer housing and the second extruder includes a second actuator for retracting and extending its nozzle assembly into and out of the outer housing.

11. The machine according to claim 9 wherein the end-effector further includes a rotary assembly inside the outer housing, said multiple-extruder module being mounted to the rotary assembly, said rotary assembly being rotatable so as to rotate the nozzle assemblies relative to the composite part without rotating the end-effector.

12. The machine according to claim 9 further comprising a table positioned relative to the end-effector and a riser positioned on the table, said composite part being fabricated on the riser so that it is spaced from the table and said table being rotatable, wherein the table includes a heat source for heating the table and the riser.

* * * * *